Aug. 21, 1962   O. G. JEDDELOH   3,050,175
APPARATUS FOR EDGE SPACING STRUCTURALLY STABLE SHEETS
Filed Aug. 24, 1959   4 Sheets-Sheet 1
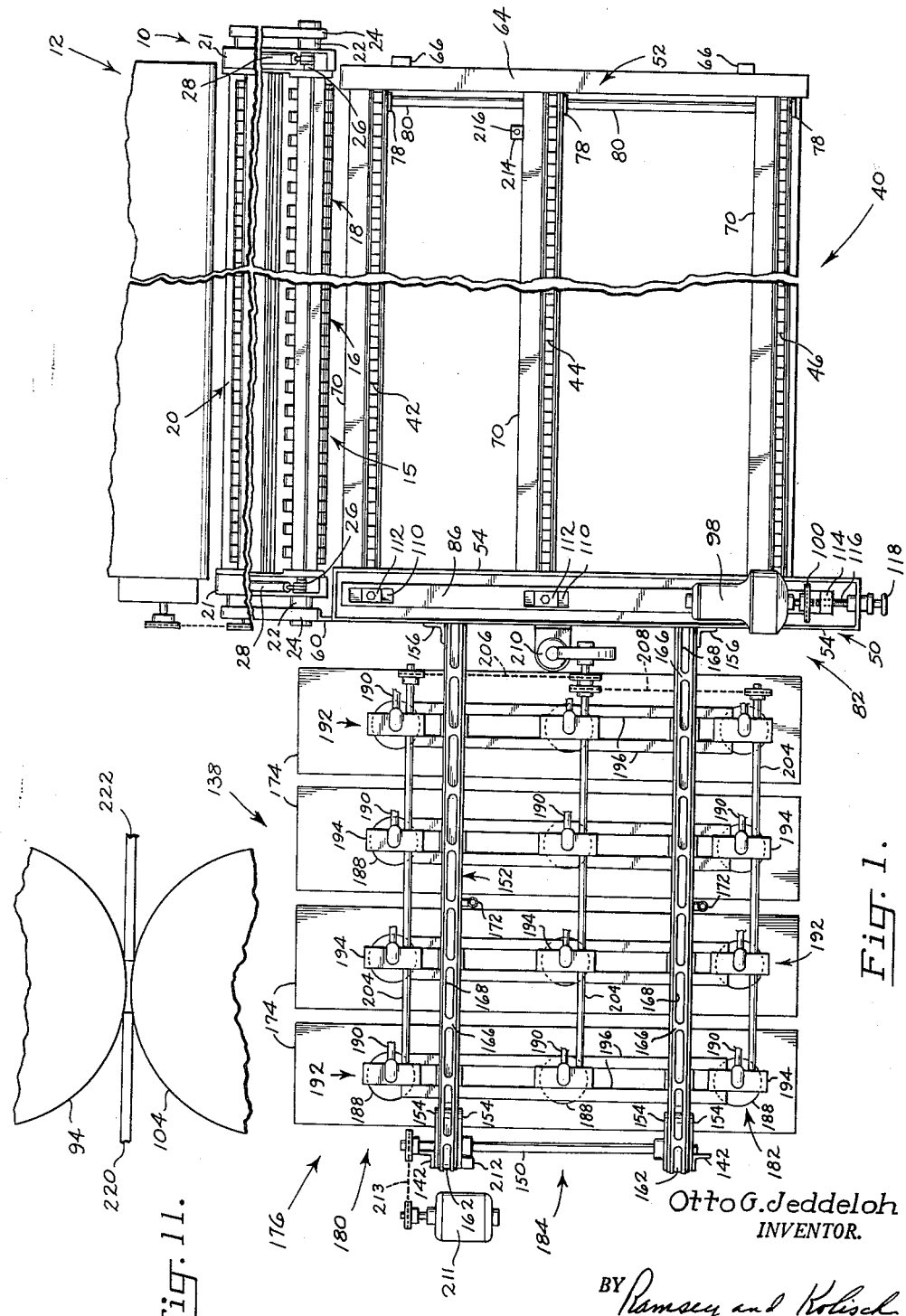
Otto G. Jeddeloh
INVENTOR.
BY Ramsey and Kolisch
Attys.

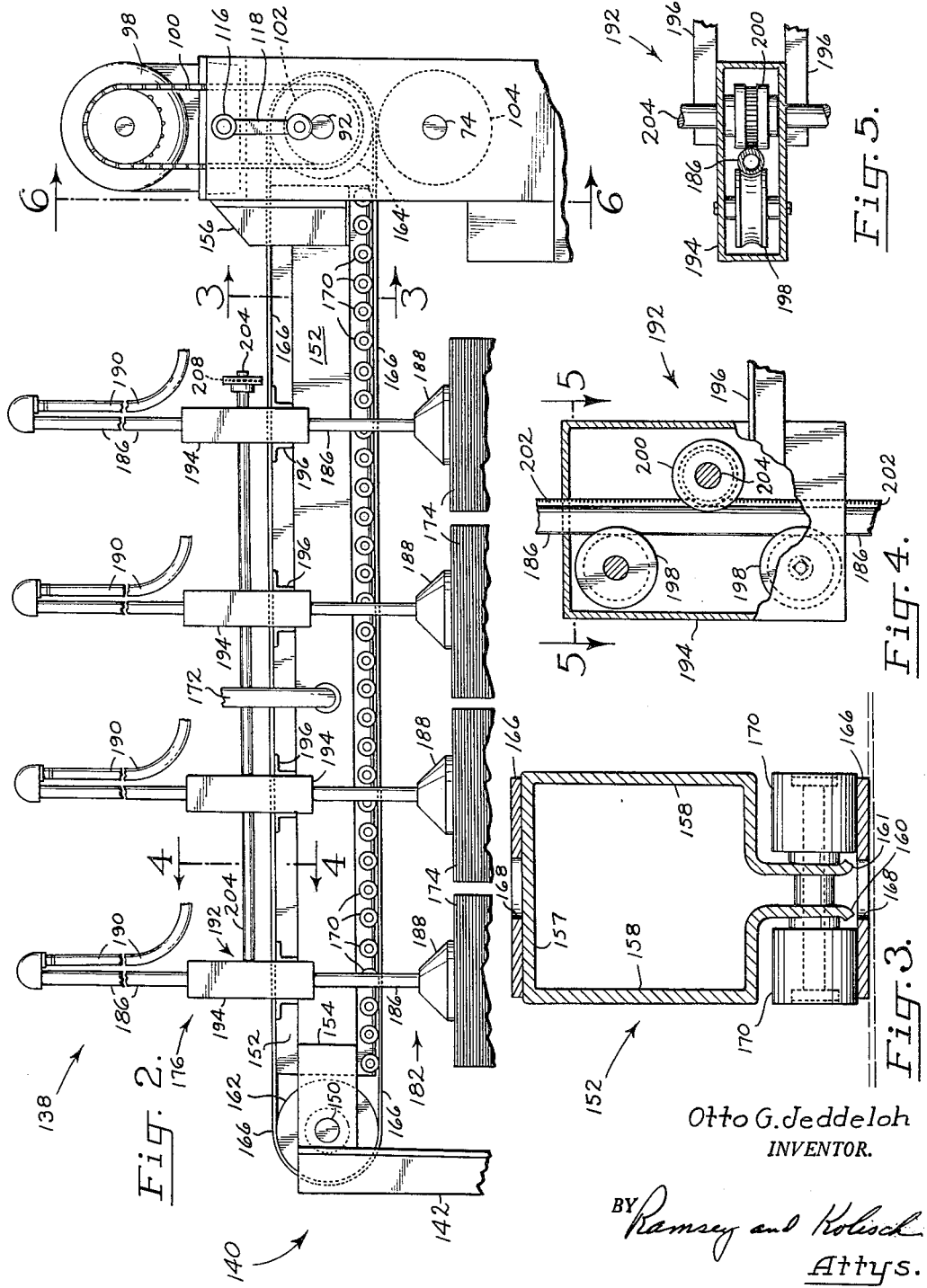

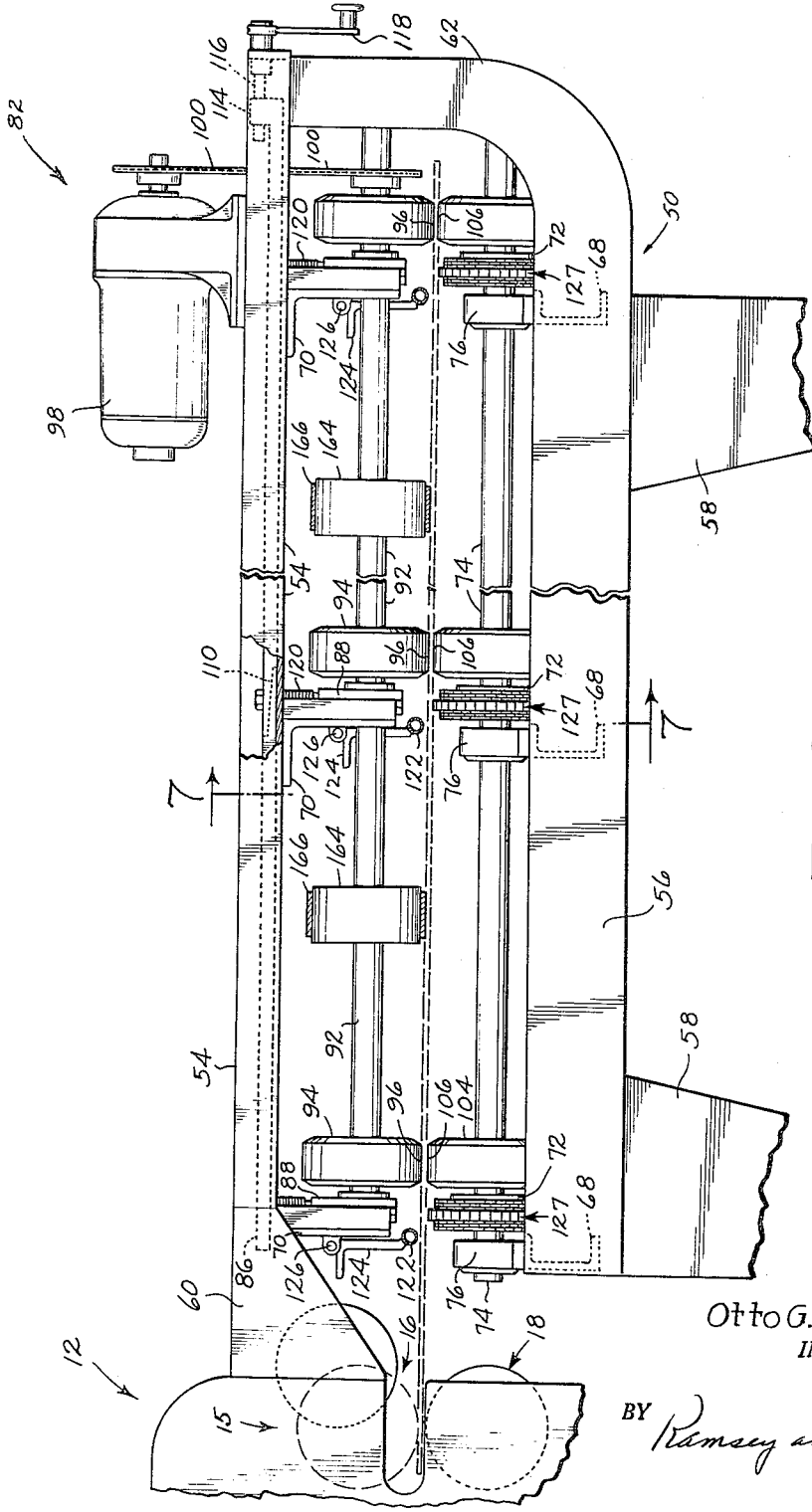

Aug. 21, 1962   O. G. JEDDELOH   3,050,175
APPARATUS FOR EDGE SPACING STRUCTURALLY STABLE SHEETS
Filed Aug. 24, 1959   4 Sheets-Sheet 4
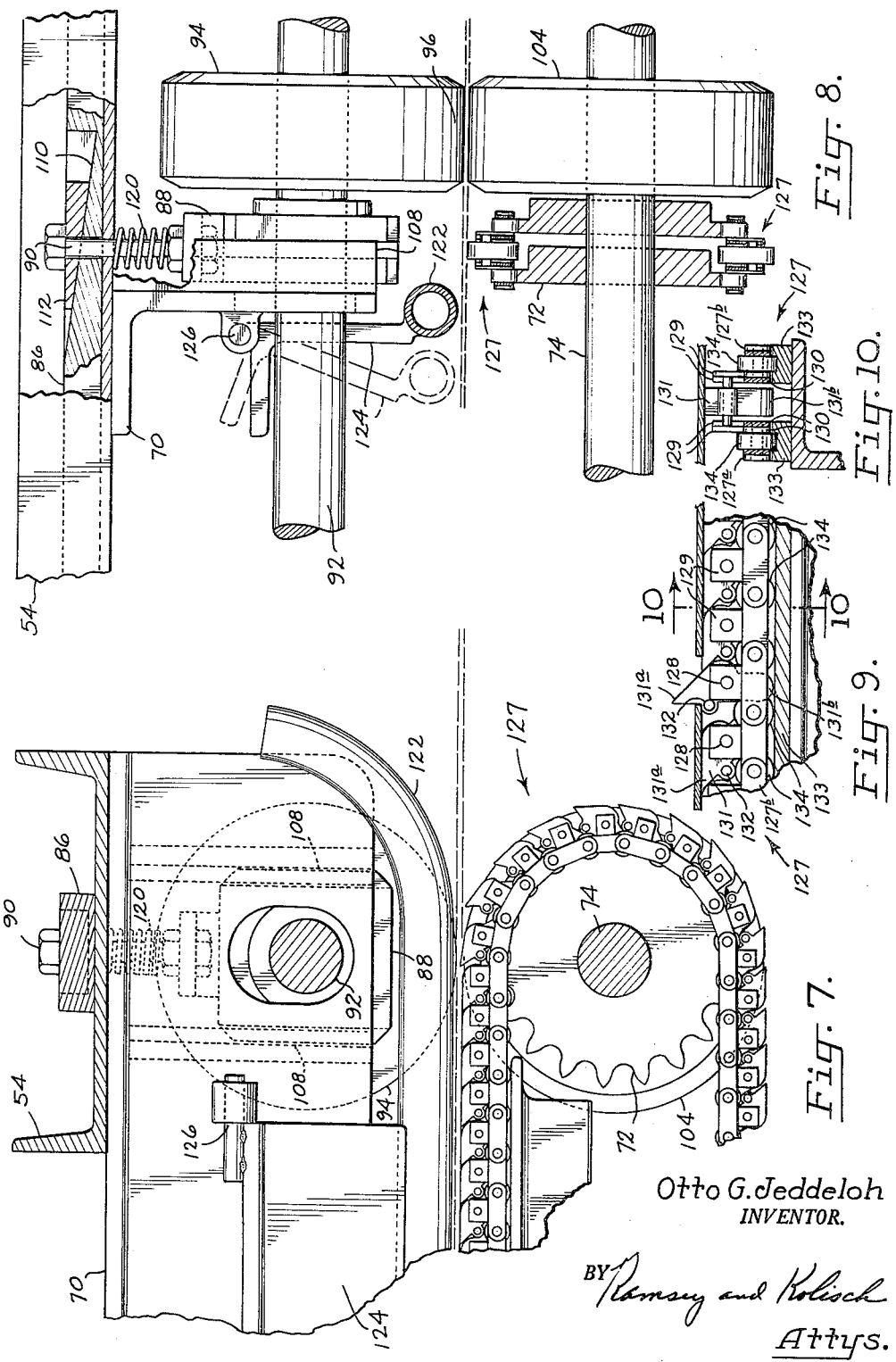
Otto G. Jeddeloh
INVENTOR.
BY Ramsey and Kolisch
Attys.

United States Patent Office 3,050,175
Patented Aug. 21, 1962

3,050,175
APPARATUS FOR EDGE SPACING STRUCTURALLY STABLE SHEETS
Otto G. Jeddeloh, Grants Pass, Oreg.
Filed Aug. 24, 1959, Ser. No. 835,560
19 Claims. (Cl. 198—34)

This invention relates to apparatus for assembling rigid and semi-rigid sheet material in edge to edge relationship with a spacing between the edges, and more particularly to a lay-up or charging conveyor constructed and arranged so that plural sheets fed to the conveyor automatically are transported therealong and at the same time given a predetermined spacing between the edges of adjacent sheets. The apparatus is useful in manufacturing operations wherein it is desired to produce a flow of spaced sheets from a source of stacked sheets or a source of sheets having random edge spacing.

The apparatus of this invention has particular utility in the drying of veneer sheets. It is conventional practice to cut veneer from a wet peeler log, and then send the veneer through a dryer prior to the manufacture of plywood therefrom. Dryers are large, expensive pieces of equipment and economical production of plywood requires that a dryer be operated at full capacity. Thus it is important that veneer pass through a dryer with predetermined spacing between sheets and without large gaps between adjacent sheets. Overlapping of sheets must also be avoided because it results in nonuniform drying of the veneer.

It is customary to feed veneer to a dryer using a feeder that advances a row of elongated sheets set side by side in a direction that moves the sheets lengthwise into the dryer. It has also been customary to lay up the row of sheets manually with a workman arranging a row of sheets on a charging table with some edge spacing between consecutive sheets in the row. This manual handling is expensive, but more important, it is difficult for a fast workman accurately to arrange such a row of sheets without inadvertently producing overlapping of edges or larger than necessary gaps between sheets. With the apparatus of this invention, a row of uniformly spaced sheets is produced automatically.

In general terms the apparatus of this invention comprises an elongated lay-up or charging conveyor section comprising plural continuous conveyor belts set side by side. The upper runs of these belts define a support plane in the conveyor section. In a veneer dryer installation, the conveyor section extends transversely of a dryer feeder and adjacent the infeed end of the veneer dryer feeder. Aligned with the lay-up conveyor section is a feed conveyor section, for transporting veneer sheets, one after another and transversely of their length, into the forward or infeed end of the lay-up conveyor section.

Power-actuated means is provided for driving the feed conveyor section and for driving intermittently the conveyor belts of the lay-up conveyor section. The power-actuated means driving the lay-up conveyor section comprises normally constantly running driving pulleys, disposed on one side of the feed path for sheets into the lay-up conveyor section. Opposite these pulleys, on the other side of the feed path, are non-powered, freely rotatable driven pulleys that are connected to the belts of the lay-up conveyor section to drive the belts when the driven pulleys are rotated. The driven pulleys are spaced a slight distance from the driving pulleys, a distance slightly less than the thickness of the sheets of veneer. The belts of the lay-up conveyor section remain stationary in the absence of any veneer between the driving and driven pulleys, since the two sets of pulleys are out of contact at this time and the driven pulleys are non-powered.

When a piece of veneer enters the infeed end of the lay-up conveyor section and passes between the driving and driven pulleys, drive is transmitted between the two sets of pulleys, and movement of the belts of the lay-up conveyor section starts.

The belts of the lay-up conveyor section are driven at a faster speed than the belts of the feed conveyor. Thus the lay-up conveyor section operates to separate successive pieces of veneer as they travel into the conveyor section. When a sheet between the sets of pulleys passes completely beyond the pulleys, movement of the lay-up conveyor belts stops, until such time as the next sheet fed by the feed conveyor catches up with the sheet just deposited on the lay-up conveyor. When the next sheet enters the bite or nip of the pulleys, the belts of the lay-up conveyor start to move again. Spacing of sheets on the lay-up conveyor section is produced, since the first sheet between the two sets of pulleys passes slightly beyond the line of closest proximity between the two sets of pulleys before stopping of the belts in the lay-up conveyor section, and starting of the belts occurs when the leading edge of the next sheet reaches a location slightly to the other side of the line of closest proximity.

Included in the invention are means mounted on the belts of the lay-up conveyor section operable to maintain the spacing in the sheets deposited thereon. The spacing produced by the pulley means just briefly described is maintained by a series of retractable lugs spaced at intervals along the length of the belts of the conveyor section. These ordinarily protrude above the main bodies of the belts. A piece of veneer deposited on the belts depresses those lugs positioned below the veneer, causing them to retract within the belt bodies. Where there is a space between two veneer pieces, the lugs remain extended. These extended lugs inhibits shifting of the veneer along the length of the belts. The lugs are particularly important when it is remembered that the veneer pieces are drawn from the lay-up conveyor by moving a row of veneer pieces laterally of the belts, and during this part of the operation the lugs prevent overlapping from occurring.

Another feature of the invention is the provision of a novel feed conveyor section for delivering sheets to the lay-up conveyor section. In the embodiment herein disclosed, the feed conveyor section comprises plural belts provided with vacuum means for holding onto top faces of veneer sheets while accommodating shifting of the sheets relative to the belts along the length of the belts. The feed conveyor section moves sheets to the lay-up conveyor where they are pulled off the feed conveyor. The vacuum means described accommodates easy shifting of the sheets during this period when they are pulled off. In a preferred embodiment it is contemplated that sheets be placed on the feed conveyor section by vacuum operated lift means adjustable in a vertical path and operable to grasp the top sheets of veneer from stacks and then to raise and to place these top sheets with the upper faces in contact with the vacuum means of the feed conveyor section.

It is a general object of this invention, therefore, to provide an improved construction for arranging plural semi-rigid and rigid sheets edge to edge and with spacing between the edges that includes a lay-up conveyor and means intermittently for driving the conveyor having oppositely disposed pulleys placed in driving and driven relationship only when a sheet passes between the pulleys.

Another general object is to provide apparatus for arranging sheets edge to edge which comprises an elongated lay-up conveyor, a feed conveyor aligned therewith for feeding sheets thereto, and power-actuated means for driving each of the conveyors, the power-actuated means for the lay-up conveyor section comprising driving and driven pulleys normally out of contact with each other but placed in driving and driven relationship when a sheet passes from the feed conveyor to the lay-up conveyor.

Another object of the invention is to provide, in combination with a veneer dryer feeder having opposed pinch roll mechanisms for advancing sheets, a lay-up conveyor section disposed so that sheets may be placed on the lay-up conveyor section with one set of ends between the pinch roll mechanisms of the feeder when the pinch roll mechanisms are spaced apart, and constructed so that edge spacing in the veneer occurs automatically in the lay-up conveyor section.

Another object of the invention is to provide a lay-up conveyor for arranging sheets which comprises plural laterally spaced continuous conveyor belts defining a support plane in the lay-up conveyor, and for each of the belts a driving and driven pulley positioned to produce movement of the belts only when a sheet enters the conveyor, such movement resulting from the sheet transmitting drive from each driving pulley to its complementing driven pulley.

Another object is to provide such a lay-up conveyor wherein the belts of the conveyor include retractable lug means operable to maintain spacing in sheets after such spacing is produced by the driving and driven pulleys.

Another object is to provide a novel feed conveyor construction for feeding sheets serially into the feed end of such a lay-up conveyor.

A still further object is to provide a novel feed conveyor which includes vacuum means whereby sheets are fed automatically one after another to a lay-up conveyor and wherein the sheets are easily removed from the feed conveyor by being pulled off the feed conveyor by the lay-up conveyor.

Other objects and advantages are attained by the invention, the same being described hereinbelow in conjunction with the accompanying drawings, wherein:

FIG. 1 is a plan view of apparatus constructed according to this invention, showing portions of a dryer feeder, a lay-up conveyor section extending transversely of the infeed end of the dryer feeder, and feed conveyor means for feeding sheets in a path to the lay-up conveyor section;

FIG. 2 is a side elevation of the feed conveyor means in FIG. 1, slightly enlarged and showing details of construction;

FIG. 3 is an enlarged section view along the line 3—3 in FIG. 2;

FIG. 4 is a section view along the line 4—4 in FIG. 2, showing details of a lift mechanism for moving sheets onto the feed conveyor;

FIG. 5 is a section view along the line 5—5 in FIG. 4;

FIG. 6 is an end elevation of the infeed end of the lay-up conveyor section;

FIG. 7 is a section view along the line 7—7 in FIG. 6, and slightly enlarged;

FIG. 8 is an enlarged view of one set of driving and driven pulleys in the lay-up conveyor section;

FIG. 9 is an enlarged view of portions of a belt in the lay-up conveyor;

FIG. 10 is a section view along the line 10—10 in FIG. 9; and

FIG. 11 (appearing on the sheet having FIG. 1) is a schematic illustration of the manner in which edge spacing is produced in sheets moved into the infeed end of the lay-up conveyor section.

Referring now to the drawings, and more particularly to FIG. 1, portions of a veneer dryer feeder or loading mechanism are indicated at 10. Such feeder mechanism is operable to advance veneer sheets into the decks of a multiple deck conveyor assembly, indicated at 12. The conveyors of assembly 12 are used to transport veneer sheets through the usual veneer dryer (not shown). Conveyor assembly 12 has multiple levels or decks, so that several layers of sheets pass through the dryer at one time. Feeder mechanism 10, also partially shown in FIG. 6, has an advancing mechanism 15 that includes at the infeed end thereof top and bottom pinch roll mechanisms 16 and 18, respectively. At the outfeed end of the feeder is another pair of pinch roll mechanisms 20 (see FIG. 1). The two sets of pinch roll mechanisms are mounted on a pivotable frame 21 that pivots at pivot 22 relative to a main frame 24. On pivotal movement of frame 21 the outfeed end of the advancing mechanism 15 moves up and down past registering positions with successive decks (not shown) of assembly 12. This way sheets may be fed to different levels of assembly 12. To start movement of sheets through the feeder, the top pinch roll mechanism 16 is swung down against bottom roll mechanism 18, the top roll mechanism pivoting at 26 relative to frame 21. Swinging of the top roll mechanism 16 down on the bottom roll mechanism 18 produces clamping engagement of the roll mechanisms on top and bottom faces of veneer, and with power means rotating one of the roll mechanisms, this produces travel of veneer through the feeder. Fluid motors 28 provide power for pivoting the top roll mechanism 16. With the top roll mechanism raised, the bottom roll mechanism 18 provides support for the ends of veneer sheets resting thereon. The feeder mechanism is the subject of a Patent No. 2,876,009 entitled "Sheet Loading Mechanism for Multideck Conveyor," issued March 3, 1959, and reference is made to the patent for a more complete description of the feeder.

In front or adjacent the infeed end of the feeder mechanism 10 (or toward the bottom of the page from the feeder mechanism in FIG. 1) is a lay-up or charging conveyor section, indicated generally at 40. The conveyor section is provided with elongated and continuous conveyor belts 42, 44, and 46, extending transversely of the path that sheets travel when moving through the feeder. The conveyor belts have horizontal top runs that define a support plane for veneer sheets in the conveyor section.

Considering now in more detail the construction of lay-up or charging conveyor section 40, and referring now to FIGS. 1 and 6, at the infeed or forward end is an upright frame standard 50 and at the opposite end of the section is an upright frame standard 52. Standard 50 (see FIG. 6) comprises a transversely extending channel beam 54, a transverse frame member 56 spaced therebelow, and legs 58. Beam 54 is supported over transverse frame member 56 by securing one end through a bracket 60 to the main frame 24 of the feeder and its other end to an upstanding portion 62 of member 56. Rear frame standard 52 includes an upper transverse frame member 64 (see FIG. 1), and a lower transverse frame member similar to member 56 having legs supporting the same above the ground (the lower transverse member and legs being obscured from view in FIG. 1). Frame member 64 is supported above the lower frame member by brackets 66. Interconnecting the frame standards 50, 52 are longitudinally extending angle irons comprising a lower set indicated at 68 and an upper set indicated at 70. The angle irons and standards make up a rigid, skeleton-type frame structure.

At the infeed end of the conveyor section belts 42, 44, and 46 are trained over sprockets 72 secured to a common shaft 74. Shaft 74 is journaled in bearings 76 secured to the frame. The belts at the other ends of their runs are trained over sprockets 78 (see FIG. 1) secured to a common shaft 80. This shaft in turn is rotatably mounted on the frame of the conveyor section by bearings similar to bearings 76 (obscured from view in FIG. 1).

Power-actuated means, generally indicated at 82, is provided for driving the belts of the lay-up conveyor section 40. Drive for the belts is by means of plural sets of driving and driven pulleys provided at the infeed end of the conveyor section. Specifically, referring now to FIGS. 1, 6, and 8, between the bordering flanges of channel beam 54 is an elongated support bar 86. Depending from bar 86 are three hanger bearings spaced along the bar and indicated at 88. Each of these includes a stud portion 90 that extends up through accommodating bores made in bar 86 and the base of beam 54. The hanger bearings journal a shaft 92 disposed above shaft 74. Shaft 92 mounts, on one side of the path of material through the conveyor section, three driving pulleys or rolls indicated at 94. These have pulley surfaces 96 that engage the top faces of veneer traveling onto the conveyor of section 40. The pulleys are secured to the shaft so as to rotate with rotation of the shaft. Drive for the driving pulleys is by means of powered means or motor 98, chain 100, and sprocket 102 secured to shaft 92.

Disposed opposite driving pulleys 94 and secured to shaft 74 to rotate with the shaft are non-powered, freely rotatable driven pulleys 104 complementing pulleys 94 and having pulley surfaces 106. These pulley surfaces engage the bottom faces of veneer. The pulley surfaces of the two sets of pulleys are out of contact with each other, and are spaced apart a distance less than the thickness of veneer.

The spacing between the pulleys may be adjusted to take care of different veneer thicknesses. This adjustment is made by moving bar 86 longitudinally in channel beam 54. This causes bearings 88 to move either up or down in guides 108. Specifically, bar 86 is provided with sloping surfaces 110 (see FIG. 8), one for each of the hanger bearings. Sliding on these surfaces are wedge elements 112. The wedge element and stud portion 90 for each hanger bearing are prevented from moving longitudially of channel beam 54 by the bore in beam 54 receiving stud 90. One end of the channel beam is provided with an internally threaded portion 114, which receives a screw portion 116 of a rotatably mounted turn handle 118. Turn handle 118 and screw 116 may be rotated relative to threaded portion 114 to produce shifting of bar 86 longitudinally of channel beam 54. On longitudinal movement of the bar, the wedge elements slide over sloping surfaces 110 either to raise or to lower the hanger bearings. Compression springs 120 interposed between the bottom of channel beam 54 and upper portions of the hanger bearings urge the hanger bearings and shaft 92 downwardly relative to channel beam 54. The springs permit shifting of the driving pulleys away from pulleys 104 to take care of irregularities in veneer thickness.

Lay-up conveyor section 40 also has extending along its length and adjacent each belt a holddown bar 122. These are mounted on the upper set of angle irons 70 by angle iron members 124 that are pivoted at 126 to members 70. A function of the holddown bars is to hold veneer pieces against chain belts 42, 44, 46. The bars may pivot from the position shown in FIGS. 6 and 8 to the left and to the position shown in dashed outline in FIG. 8, to permit easy withdrawal of veneer from the lay-up conveyor section in a direction transversely of the length of the conveyor (or in a direction extending along the length of the sheets deposited on conveyor section 40). This is the direction of movement produced by the pinch roll mechanisms of feeder 10.

Referring now to FIGS. 7, 8, 9, and 10 for a description of belts 42, 44, 46, these belts are similar in construction, and only one will be described. Each has a flexible body 127 comprising two elongated and flexible chain halves 127a, 127b disposed side by side and joined by pins 128. The pins 128 extend between and have their ends mounted in extensions 129 integral with the inner links 130 of the chain halves. Pivoted on pins 129 are lugs 131 spaced along the length of the chain belt that have upper ends 131a extending above the support plane defined by the belts in the absence of veneer lying thereover. The upper ends of the lugs are urged to a position above the support plane of the belts (an extended position) by heavy bottoms 131b of the lugs that are pulled by gravity downwardly. Projections 132 integral with lugs 131 strike extensions 129 to limit movement of the lugs in a clockwise direction in FIG. 9. The upper ends 131a of the lugs are retractable downwardly from their raised or extended position when a piece of veneer pushes down on the lugs (as aided by holddown bars 122). In operation, after veneer is spaced on lay-up conveyor section 40 by the driving and driven pulleys, lugs 131 function to maintain that spacing, through those lugs that fall where a spacing occurs pivoting to an extended position. The lugs inhibit movement of veneer along the length of the belts 42, 44, 46, but accommodate withdrawal of veneer in a transverse direction while guiding veneer during its withdrawal. The upper horizontal run of each belt is supported along the length of conveyor section 40 by guides 133 suitably mounted on the frame that contain grooves receiving rollers 134 of the belts.

To the left of the infeed end of lay-up conveyor section 40 in FIG. 1 is a feed conveyor means, indicated generally at 138. This is for feeding sheets, one after another, into the lay-up conveyor section, and thus it constitutes means defining a path for the feed of sheets to section 40. Specifically, and now referring to FIGS. 1, 2, 3, 4, and 5, feed conveyor means 138 comprises a frame 140, including uprights 142 supporting the left end of the conveyor in FIGS. 1 and 2. Frame 140 mounts a rotatable drive shaft 150, and between drive shaft 150 and the feed end of lay-up conveyor section 40 a pair of elongated hollow tanks 152. Tanks 152 have one set of ends secured to uprights 142 by brackets 154, and their other set of ends secured to frame 50 by brackets 156. The tanks have the cross section shown in FIG. 3, and have top and sides 157, 158, respectively, forming within the tanks an elongated vacuum chamber. At the base of each tank, lips, indicated at 160, 161, define elongated slot means opening up the interior of the tank.

Drive shaft 150 has secured thereon a pair of pulleys 162 (see FIG. 2). Rotatably mounted on shaft 92 of the lay-up conveyor section are a pair of pulleys 164. Trained over pulley sets 162, 164 are a pair of elongated and continuous flexible belts 166. These may be made of rubber, a synthetic or similar type material. The belts have elongated slots or perforated means 168 formed therein. The upper runs of belts 166 slide over tops 157 of the tanks. The lower runs of belts 166 move between pulleys 162, 164 while passing over rollers 170 rotatably mounted on lips 160, 161. The tank members are closed at their ends, and each has a vacuum line 172 connected thereto. These connect with a vacuum source (not shown). When vacuum conditions are produced in a tank, the lower run of the belt 166 for the tank is pulled upwardly and its inner face engages rollers 170. This opens the interior of the tank to its slots of the belts, and air is pulled into the tank through the slots. Pieces of veneer flat against the lower faces of the belts are held firmly in place by this pull of air. The grab of the belts with veneer is not so great as to prevent veneer pieces from sliding along the belts when they are grabbed by the driving and driven pulleys at the infeed end of the lay-up conveyor section.

Veneer is stacked below the bottom runs of belts 166, in stacks 174. Top pieces from the stacks are brought into contact with the bottom runs of the belts by lift mechanism, indicated generally at 176. This also, in the embodiment shown, relies on vacuum or suction mechanism for holding onto the sheets of the stacks. Specifically, supported outwardly of the belts 166 are two rows of suction cup mechanisms, indicated at 180 and 182, respectively. Intermediate the belts 166 is another row of suction cup mechanisms 184. Each suction cup mechanism in the various rows comprises an upright hollow tube portion 186 provided at the bottom end thereof with a suction cup 188. A vacuum is introduced to the interior of each hollow tube portion by a vacuum line 190 connected to a vacuum source (not shown). Each of the tube portions is moved up and down by a hoist mechanism, generally indicated at 192 and best illustrated in FIGS. 4 and 5. Each comprises a box housing 194 that is supported on frame 140 by angle irons 196. Rotatably mounted within housing 194 are a pair of positioning pulleys 198. On the other side of these pulleys is a toothed pulley wheel 200. The teeth of this pulley wheel mesh with teeth of a rack 202 extending along the length of each tube portion 186. Movement of tube 186 up or down occurs with rotation of wheel 200.

Driving the various hoist mechanisms are shafts 204 that extend the length of the feed conveyor. Pulley wheels 200 are secured to these shafts. The shafts 204 are driven by chains 206, 208, and reversible motor 210.

Completing the description of the apparatus, powered means or motor 211 and chain 213 constitute power-actuated means for rotating shaft 150 and pulleys 162 secured to the shaft. Switch 212 (see FIG. 1) is used for manually stopping and starting motor 211. In the path of material transported by lay-up conveyor section 40 is a normally closed switch 214 controlled by finger 216. Switch 214 is for automatic control of motor 210, and is connected in series with switch 212. When switch finger 216 is depressed by the occurrence of a piece of veneer thereover, switch 214 opens to prevent actuation of motor 211.

Explaining the operation of the device, it will be remembered that motor 98 normally is running constantly. This produces constant rotation of drive pulleys 94 secured to shaft 92. In the absence of any veneer between pulley sets 94 and 104, chain belts 42, 44, 46 remain stationary.

Let it be assumed that conveyor section 40 is fully loaded with veneer. To clear the lay-up conveyor section, upper pinch roll mechanism 16 of advancing mechanism 15 is swung downwardly toward bottom roll mechanism 18. This moves sheets from the lay-up conveyor section and empties it. The upper pinch roll mechanism is then raised, to prepare the lay-up conveyor section for loading. To load the lay-up conveyor section, tube portions 186 are lowered to bring the suction cups 188 mounted on the ends of the tube portions into contact with the top pieces of veneer in stacks 174. The arms are then raised by reversing motor 210, causing cups 188 to bring veneer grabbed by the cups into contact with belts 166. Belts 166 then grab the veneer and ready it for transport into the lay-up conveyor section 40.

Motor 211 may then be actuated to cause movement of belts 166 with the lower runs of the belts moving toward the infeed end of the lay-up conveyor section. As the foremost sheet carried by the belts moves toward the bite or nip of the drive and driven pulley sets 94, 104 (and now referring to FIG. 11), driving contact is produced between the pulley sets. This occurs slightly before the lead edge of the veneer sheet reaches the line of closest proximity between the two sets of pulleys, at about the position of sheet 220 in FIG. 11. When pulleys 104 rotate, chain belts 42, 44, 46 move from left to right in FIG. 1, and move the just fed sheet of veneer away from the infeed end of conveyor section 40. The belts move at a speed determined by motor 98 which is faster than the speed of belts 166. Thus the just fed sheet is "walked away" from the following sheet. When the sheet clears the nip of the driving and driven pulley sets, and occupies the position of veneer sheet 222 in FIG. 11, drive between the driving and driven pulley sets ceases and belts 42, 44, 46 stop. Belts 42, 44, 46 do not run again until a following piece of veneer is moved to the position of sheet 220 in FIG. 11. This causes the belts 42, 44, 46 to move again, with a spacing of predetermined amounts produced between the sheets. This action repeats until either the leading sheet on section 40 strikes switch finger 216, or until the feed conveyor is emptied of sheets.

The organization of the lay-up conveyor section and the dryer feeder is important. By feeding one set of end edges of the sheets on section 40 between the pinch mechanisms of the feeder, it is possible immediately to advance sheets into a dryer by bringing the pinch rolls together. In other words, the lay-up conveyor section holds the sheets ready for feed to the dryer and there is no need to include any mechanism for moving sheets from off the lay-up conveyor section into the dryer feeder.

It is appreciated that changes may be made in the parts and/or their arrangement, and that modifications are possible other than the one specifically disclosed. It is desired not to be limited to the specific form of invention described, but to cover all modifications and variations that would be apparent to one skilled in the art and that come within the scope of the appended claims.

It is claimed and desired to secure by Letters Patent:

1. Apparatus for assembling structurally stable sheet material in edge to edge relationship with spacing between the edges comprising a frame, an endless conveyor defining a support plane for sheet material mounted on said frame, means defining a path for feeding material to the conveyor, a non-powered freely rotatable driven pulley connected to the conveyor to move the conveyor on rotation of the pulley and mounted on one side of the path of material fed to the conveyor in position to engage one side of sheet material fed to said conveyor, and a power-driven driving pulley disposed opposite said freely rotatable driven pulley on the other side of said path, said driving pulley being spaced from said driven pulley a distance less than the thickness of the sheet material handled, said driving pulley driving said driven pulley only when sheet material passes between the two pulleys by pressing sheet material against the freely rotatable driven pulley so that drive is transmitted from the driving pulley to the driven pulley.

2. Apparatus for assembling structurally stable sheet material in edge to edge relationship with spacing between the edges comprising a frame, an endless lay-up conveyor mounted on the frame and defining a support plane for sheet material, feed conveyor means for feeding material to said lay-up conveyor and defining a path for feeding for such material to the infeed end of said lay-up conveyor, a non-powered freely rotatable driven pulley connected to the lay-up conveyor to move the conveyor on rotation of the pulley and mounted on one side of the path of material fed to the lay-up conveyor in position to engage one side of sheet material fed to the lay-up conveyor, a driving pulley disposed oppositely of said driven pulley and mounted on the other side of said path, the spacing between the pulleys being less than the thickness of the sheet material handled, powered means for driving the feed conveyor means at a given speed, and powered means for driving the driving pulley of the lay-up conveyor at a speed that is faster than the speed of the feed conveyor means, said driving pulley driving the freely rotatable driven pulley only when sheet material passes between the pulleys by pressing sheet material against the freely rotatable driven pulley so that drive is transmitted from the driving to the driven pulley.

3. Apparatus for assembling rigid and semi-rigid sheets of material in edge to edge relationship with spacing between the edges comprising a frame, an endless lay-up conveyor mounted on the frame and defining a support plane for the sheets of material, feed conveyor means for feeding sheets of material to said lay-up conveyor and defining a path for feeding sheets to the lay-up conveyor, power-actuated means for driving the feed conveyor means, and power-actuated means for driving intermittently the lay-up conveyor, said last mentioned power-actuated means comprising a normally constantly driven driving pulley mounted on one side of the path of material fed to the lay-up conveyor, and a non-powered freely rotatable driven pulley connected to the lay-up conveyor to move the conveyor on rotation of the pulley, said driven pulley being disposed oppositely of said driving pulley on the other side of said path in position to engage one side of sheet material fed to the lay-up conveyor, said driving pulley being spaced from the freely rotatable driven pulley a distance less than the thickness of the sheets handled and being operable to transmit drive to the driven pulley only when sheets pass between the two pulleys by pressing sheets of material against the freely rotatable driven pulley so that drive is transmitting from the driving pulley to the driven pulley.

4. Lay-up conveyor appartus for the assembly of rigid and semi-rigid sheets in edge to edge relationship with a spacing between the edges comprising a frame, plural endless conveyor belts laterally spaced from each other supported on the frame with their upper runs defining a support plane for the sheets, a sprocket for each belt mounting the forward ends of the belt runs, said sprockets being aligned and secured to a common shaft, non-powered freely rotatable driven pulley means mounted on said shaft for rotation with the shaft and having a pulley surface disposed with the top thereof substantially at the level of said support plane, driving pulley means mounted above said freely rotatable driven pulley means and having a pulley surface disposed substantially directly above and spaced a distance from the pulley surface of said driven pulley means that is less than the thickness of the sheets, and powered means for driving said driving pulley means, said driving pulley means driving said driven pulley means only when a sheet passes between the two pulley surfaces by pressing the sheet against the freely rotatable driven pulley means so that drive is transmitted from the driving pulley means to the driven pulley means.

5. Lay-up conveyor apparatus for the assembly of rigid and semi-rigid sheets in edge to edge relationship with a spacing between the edges comprising a frame, plural endless conveyor belts laterally spaced from each other supported on said frame with their upper runs defining a support plane for the sheets, a sprocket for each belt mounting the forward ends of the belt runs, said sprockets being aligned and secured to a common shaft, non-powered freely rotatable driven pulley means mounted on said shaft for rotation with the shaft and having a pulley surface disposed with the top thereof substantially at the level of said support plane, driving pulley means and means mounting the same above said driven pulley means, said driving pulley means having a pulley surface disposed substantially directly above and spaced a distance from the pulley surface of the driven pulley means that is less than the thickness of the sheets, the means mounting the driving pulley means including mechanism for adjusting the spacing between the two pulley surfaces, and powered means for driving said driving pulley means, said driving pulley means driving said driven pulley means only when a sheet of material passes between the two pulley surfaces by pressing the sheet against the freely rotatable driven pulley means so that drive is transmitted from the driving pulley means to the freely rotatable driven pulley means.

6. The apparatus of claim 5 wherein said driven pulley means comprises plural pulleys interspersed with the endless conveyor belts, and wherein said driving pulley means comprises plural pulleys complementing the pulleys of said driven pulley means.

7. Apparatus for assembling structurally stable sheet material in edge to edge relationship with spacing between the edges comprising a frame, an endless conveyor defining a support plane mounted on said frame, means defining a path for feeding material to the conveyor, a non-powered fully rotatable driven pulley connected to the conveyor to move the conveyor on rotation of the pulley and at one side of the path of material fed to the conveyor, a powered driving pulley disposed opposite said driven pulley on the other side of said path, the latter being spaced from said driven pulley a distance that is less than a thickness of the sheet material and driving said driven pulley only when sheet material is disposed between the two pulleys by pressing the sheet material against the freely rotatable driven pulley so that drive is transmitted from the driving pulley to the driven pulley, and means included in the endless conveyor inhibiting shifting of material along the length of the conveyor.

8. Lay-up conveyor apparatus for assembling rigid and semi-rigid sheets in edge to edge relationship with a spacing between the edges comprising a frame, plural laterally spaced endless conveyor belts supported on the frame and having upper runs defining a support plane, aligned sprockets mounting the forward ends of the belt runs, a common shaft secured to the sprockets, said sprockets and shaft rotating as a unit, driven pulley means secured to the shaft to rotate with the shaft and having a pulley surface disposed with the top thereof substantially at the level of said support plane, driving pulley means mounted above said driven pulley means and having a pulley surface disposed directly above and spaced a slight distance from the pulley surface of said driven pulley means, powered means for driving said driving pulley means, the latter driving said driven pulley means only when a sheet passes between the two pulley surfaces, and means inhibiting shifting of sheets deposited on the belts along the length of the belts, said means comprising plural retractable lug means mounted on said endless belts spaced along the length thereof and extending upwardly from the plane defined by the belts, said lug means being retractable below said plane when sheets are laid thereover.

9. In combination with a veneer dryer feeder, said feeder having advancing mechanism for advancing sheets therethrough including a pair of oppositely disposed pinch roll mechanisms at the infeed end of the feeder and means for bringing the pinch roll mechanisms together into clamping relationship with opposite faces of veneer sheets, a lay-up conveyor section across the infeed end of the feeder extending transversely of the path of the sheets through the feeder and operable to support plural veneer sheets with one set of ends disposed between the pinch roll mechanisms, said lay-up conveyor section having endless conveyor means defining a support plane for sheets, and means intermittently for driving the conveyor means of said lay-up conveyor section, the latter means comprising a powered driving pulley on one side of said support plane, a driven pulley disposed opposite said driving pulley on the other side of said support plane, and means drivingly connecting said driven pulley and conveyor means, said driving and driven pulleys being spaced apart a distance less than the thickness of the veneer sheets, said driving pulley powering the driven pulley when a veneer sheet passes between the two.

10. The apparatus of claim 9 wherein the lay-up conveyor section further comprises means for inhibiting shifting of sheets on the conveyor means of the section along the length of the conveyor section, said means accommodating free movement of veneer sheets transversely of the lay-up conveyor into the dryer feeder.

11. Apparatus for assembling semi-rigid and rigid sheets in edge to edge relationship with a spacing between the edges comprising an endless lay-up conveyor means, an endless feed conveyor for feeding sheets in a path to the lay-up conveyor means, said feed conveyor having suction means for gripping onto sheets that accommodates movement of the sheets along the length of the feed conveyor, power-actuated means for driving the feed conveyor at a predetermined speed, and power-actuated means for driving intermittently the lay-up conveyor means at a faster speed, said last-mentioned power-actuated means comprising a pair of pulley members spaced out of contact with each other with one on one side and the other on the other side of the path of material into said lay-up conveyor means, one of said pulley members being non-powered and freely rotatable, means drivingly connecting said one pulley member to the lay-up conveyor means, and powered means for driving the other pulley member, said pulley members being spaced apart a distance less than the thickness of the sheets and being placed in driving and driven relationship when a sheet passes thereinbetween with the sheet transmitting drive from said other pulley member to said one pulley member.

12. The apparatus of claim 11 wherein said lay-up conveyor means is further provided with means inhibiting shifting of sheets along the length of the conveyor means.

13. Apparatus for arranging rigid and semi-rigid sheets in edge to edge relationship with spacing between the edges comprising an endless lay-up conveyor means, an endless feed conveyor for feeding sheets to the lay-up conveyor means, said feed conveyor having a substantially horizontally disposed elongated lower run for transporting sheets provided with suction means for gripping the top faces of the sheets with the sheets held below the run of the conveyor, said suction means accommodating shifting of the sheets along the length of the feed conveyor, power-actuated means for driving the feed conveyor at a predetermined speed, and power-actuated means for driving intermittently the lay-up conveyor means at a faster speed, said last-mentioned power-actuated means comprising a pair of pulley members spaced out of contact with each other with one on one side and the other on the other side of the path of material into said lay-up conveyor means, one of said pulley members being non-powered and freely rotatable, means drivingly connecting one pulley member to the lay-up conveyor means, and powered means for driving the other pulley member, said pulley members being spaced apart a distance less than the thickness of the sheets and being placed in driving and driven relationship when a sheet passes thereinbetween with the sheets transmitting drive from said other pulley member to said one pulley member.

14. The apparatus of claim 13 which further comprises mechanism for supplying sheets to the feed conveyor including lift means operable to lift sheets against the lower run of the feed conveyor.

15. The apparatus of claim 14 wherein the lift means comprises suction means for holding onto sheets as they are lifted against said lower run.

16. Apparatus for arranging sheets of veneer in edge to edge relationship with spacing between the edges comprising an endless lay-up conveyor, an endless feed conveyor for feeding sheets to the lay-up conveyor, said feed conveyor having means for holding onto sheets while accommodating shifting of the sheets along the length of the conveyor, said feed conveyor comprising an elongated and continuous flexible belt provided with perforate means along the length thereof and having top and bottom runs, the bottom run of said belt passing over an elongated vacuum chamber disposed adjacent the inner face of the run and having slot means adjacent said inner face opening the vacuum chamber to said perforate means, means for driving said feed conveyor at a predetermined speed, and means for driving said lay-up conveyor at a faster speed, the latter means comprising a pair of pulleys at the infeed end of the lay-up conveyor and on opposite sides of the path of sheets traveling into the lay-up conveyor, said pulleys being spaced apart from each other a distance less than the thickness of the veneer sheets, one of said pulleys being driven constantly, the other of said pulleys being connected to the lay-up conveyor, drive being transmitted between the two pulleys only when a sheet of veneer passes between the pulleys.

17. In combination with a veneer sheet feeder, said feeder having advancing mechanism for advancing sheets therethrough including a pair of oppositely disposed pinch roll mechanisms at the infeed end of the feeder and means for bringing the pinch roll mechanisms together against opposite faces of veneer sheets, the improvement comprising a lay-up conveyor section extending across the infeed end of said feeder and transversely of the path of sheets through the feeder and constructed to support plural veneer sheets with one set of their ends disposed between said pinch roll mechanisms, said lay-up conveyor section having endless conveyor means defining a support plane for the veneer sheets, and means connected to the lay-up conveyor section for driving the same only at such times that a veneer sheet is moving over and slightly beyond the feed end thereof.

18. Apparatus for assembling structurally stable sheet material in edge to edge relationship with spacing between the edges comprising a frame, an endless conveyor mounted on said frame defining a support plane for such sheet material, a non-powered driven pulley connected to said conveyor to move the conveyor on rotation thereof, said driven pulley being mounted on one side of the path of sheet material fed to said conveyor and in position to engage one side of such sheet material, and a power-driven driving pulley disposed opposite said driven pulley and on the other side of said path, said driving pulley being spaced from said driven pulley a distance less than the thickness of the sheet material handled and driving the driven pulley when sheet material passes between the two pulleys by pressing sheet material against the driven pulley.

19. In combination with a veneer sheet feeder, said feeder having advancing mechanism for advancing sheets therethrough including a pair of oppositely disposed pinch roll mechanisms at the infeed end of the feeder and means for bringing the pinch roll mechanisms together against opposite faces of veneer sheets, the improvement comprising an elongated lay-up conveyor section extending across the infeed end of said feeder and transversely of the path of sheets through the feeder, said lay-up conveyor section being constructed to support veneer sheets with the sheets side by side and extending across the conveyor section and with one set of ends of the sheets disposed between said pinch roll mechanisms, said lay-up conveyor section having endless conveyor belts defining a support plane for the veneer sheets, and means connected to the lay-up conveyor section for driving it whereby each time a veneer sheet is placed thereon its belts are moved only a distance slightly in excess of the width of a sheet, said conveyor belts including means operable to maintain a spacing between the side edges of sheets placed thereon.

References Cited in the file of this patent

UNITED STATES PATENTS

| | | |
|---|---|---|
| 549,111 | Crowell | Nov. 5, 1895 |
| 1,438,112 | Hendricks | Dec. 5, 1922 |
| 1,697,220 | Anstiss | Jan. 1, 1929 |
| 1,853,781 | Rider | Apr. 12, 1932 |
| 2,661,948 | Montgomery | Dec. 8, 1953 |